United States Patent
De Jaegher et al.

(10) Patent No.: US 7,701,879 B2
(45) Date of Patent: Apr. 20, 2010

(54) METHOD FOR CONTROL OF COMMUNICATIONS FROM EDGE DEVICE OF ACCESS NETWORK, AND EDGE DEVICE AND NETWORK MANAGEMENT MODULE FOR PERFORMING METHOD

(75) Inventors: Jeanne Emmanuelle Rita De Jaegher, Brussels (BE); Razvan Manisor, Antwerp (BE); Erwin Alfons Constant Six, Laarne (BE)

(73) Assignee: Alcatel, Paris (FR)

( * ) Notice: Subject to any disclaimer, the term of this patent is extended or adjusted under 35 U.S.C. 154(b) by 1601 days.

(21) Appl. No.: 10/944,944

(22) Filed: Sep. 21, 2004

(65) Prior Publication Data
US 2005/0063384 A1   Mar. 24, 2005

(30) Foreign Application Priority Data
Sep. 22, 2003   (EP) .................................. 03292316

(51) Int. Cl.
*H04B 7/14* (2006.01)
(52) U.S. Cl. ...................................... 370/255; 370/401
(58) Field of Classification Search ................. 370/463, 370/392, 437, 229, 230, 419, 420, 469
See application file for complete search history.

(56) References Cited

U.S. PATENT DOCUMENTS

| | | | |
|---|---|---|---|
| 5,479,642 A | 12/1995 | Jarvis | |
| 5,968,176 A | 10/1999 | Nessett et al. | |
| 6,205,148 B1* | 3/2001 | Takahashi et al. | 370/401 |
| 7,245,627 B2* | 7/2007 | Goldenberg et al. | 370/419 |
| 7,321,561 B2* | 1/2008 | Lakshminarasimha et al. | 370/252 |
| 2001/0054101 A1 | 12/2001 | Wilson | |
| 2004/0003285 A1* | 1/2004 | Whelan et al. | 713/201 |
| 2005/0063411 A1* | 3/2005 | Wang et al. | 370/437 |

FOREIGN PATENT DOCUMENTS

WO    WO 00/52575    9/2000

* cited by examiner

*Primary Examiner*—Kevin C Harper
*Assistant Examiner*—Henry Baron
(74) *Attorney, Agent, or Firm*—Sughrue Mion, PLLC

(57) ABSTRACT

A method for control of communications from an edge device of an access network, via the provisioning or the non-provisioning of at least one layer 2 destination address of at least one other edge device of the access network to the edge device by a network management module of the access network. The at least one layer 2 destination address is delivered to the edge device on request of the edge device. In an exemplary embodiment, the edge device checks, upon arrival of a packet including at least one layer 2 destination address, whether the at least one layer 2 destination address is stored within a communications restriction filter of the edge device and generates the request including the at least one layer 2 destination address in case the at least one layer 2 destination address is not stored within the communication restriction filter.

22 Claims, 2 Drawing Sheets

METHOD FOR CONTROL OF COMMUNICATIONS FROM EDGE DEVICE OF ACCESS NETWORK, AND EDGE DEVICE AND NETWORK MANAGEMENT MODULE FOR PERFORMING METHOD

BACKGROUND OF INVENTION

The present invention relates to method for communications control from an edge device of an access network, via the provisioning or the non-provisioning of at least one layer 2 destination address of at least one other edge node of this access network, to this edge device as is further described in the preamble of claim 1.

DESCRIPTION OF RELATED ART

Such a method is already known in the art, e.g. by using pre-configured filters in access multiplexers of Ethernet access networks, wherein the allowed MAC-addresses of outgoing edge nodes are stored in these filters. The prior art method and system either use a pre-configured filter in the edge nodes themselves, or use a more centralised push-mechanism from where a central control server in the network management module provides each of the edge-nodes with their pre-configured lists of allowed network devices with which they may communicate.

In some access networks, for instance connectionless aggregation networks such as Ethernet access networks, failures or reconfigurations in this network after such failures are not known to the edge nodes. This means that, if a network failure takes place, and another MAC address is associated with the same layer 3 address of the other edge node, this information is not available to the filters in the ingress edge node. The existing push mechanisms which centrally keep track of these changes but only provide this information to the edge nodes from time to time are not dynamic enough to quickly signal the changes to the edge nodes such as the access multiplexers. The other mechanism whereby the filters in the edge nodes are preconfigured at start up does not provide a solution at all since with this method the changes are never known during the operation of edge devices such as the access multiplexers.

An object of the present invention is thus to provide a method for communications control from an edge device of an access network of the above known kind, but which is dynamic enough to adapt to changes in the layer 2 destination addresses due to unforeseen circumstances such as for instance network failures.

According to the invention, this object is achieved by the fact that these layer 2 destination addresses are only delivered upon request of the edge device itself, as is further stated in the characteristic part of claim 1.

In this way, since the centralised network management module keeps track of the changes with respect to the allowed layer 2 destination addresses of edge devices within the access network, each time a request from an edge device is received with respect to such a communication to another edge device, the network management module performs an updated check and may send the latest known information to the edge node which accordingly has the up-to-date information available for its further communications.

BRIEF SUMMARY OF INVENTION

An additional characteristic feature of the present invention is further described in claim 2.

In this way, the request is generated in the edge node upon arrival of a packet including the layer 2 destination address of the destination edge node in the access network, and upon checking whether this layer 2 destination address is not yet stored within a communications restriction filter in the edge node. This ensures that, for not yet locally stored destinations, always the latest information is obtained from the network management module.

Yet another characteristic feature of the present invention is described in claim 3.

This is extremely interesting in case of network failures where not only it will be known whether a desired MAC address can still be used or not for a destination, but by providing additional layer 2 forwarding information such as a VLAN tag, possibilities for service mapping and class of service segregation are provided. Furthermore by providing higher OSI layer information such as OSI layer 3 or OSI layer 4 information possibilities for protocol and application control can be provided. For example protocols and applications that are using a certain TPC port can be allowed or blocked. With these OSI layers reference is made to the well-known 7-layer OSI model in data communications of which layer 1 represents the physical layer, layer 2 the data layer, layer 3 the network layer, layer 4 the transport layer, layer 5 the session layer, layer 6 the presentation layer and layer 7 the application layer.

Still a further characteristic feature of the present invention is described in claim 6.

Thereby, ageing is introduced to the filters within the edge nodes which keep the allowed MAC addresses. This ensures again that on a regular basis the latest information is stored within the filters ensuring a dynamic communications control.

Yet a further characteristic feature of the present invention is described in claim 7.

By having the request containing additional user information with respect to the sender of the packet, possibilities for charging are opened, as is also stated in claim 8. This further allows the control of user-to-user communications within the access network itself, which are in general not allowed under normal operating conditions, since these are normally not stored within the network management module. By yet providing the possibility to deliver such MAC addresses upon consulting the charging device, as stated in claim 9, such user-to-user communications within the access network become now possible.

Claim 10 further states that the further passage of an incoming packet through the access network is blocked in case the layer 2 destination address, for instance the MAC address of that packet, is not stored within the edge device or not received by said edge device from the network management module.

The present invention also relates to an edge node and a communications restrictions module of a network management module which are able to perform the above described method, as respectively claimed in claims 11-22.

BRIEF DESCRIPTION OF DRAWINGS

The above mentioned and other objects and features of the invention will become more apparent and the invention itself will be best understood by referring to the following description of an embodiment taken in conjunction with the accompanying drawings in which FIG. 1 gives an overview picture of an access network AN with several edge devices, internal switches, a network management module, and other neighbouring networks in which a communication is desired from edge device ED 1 to edge device ED 2.

DETAILED DESCRIPTION

Figure 1:
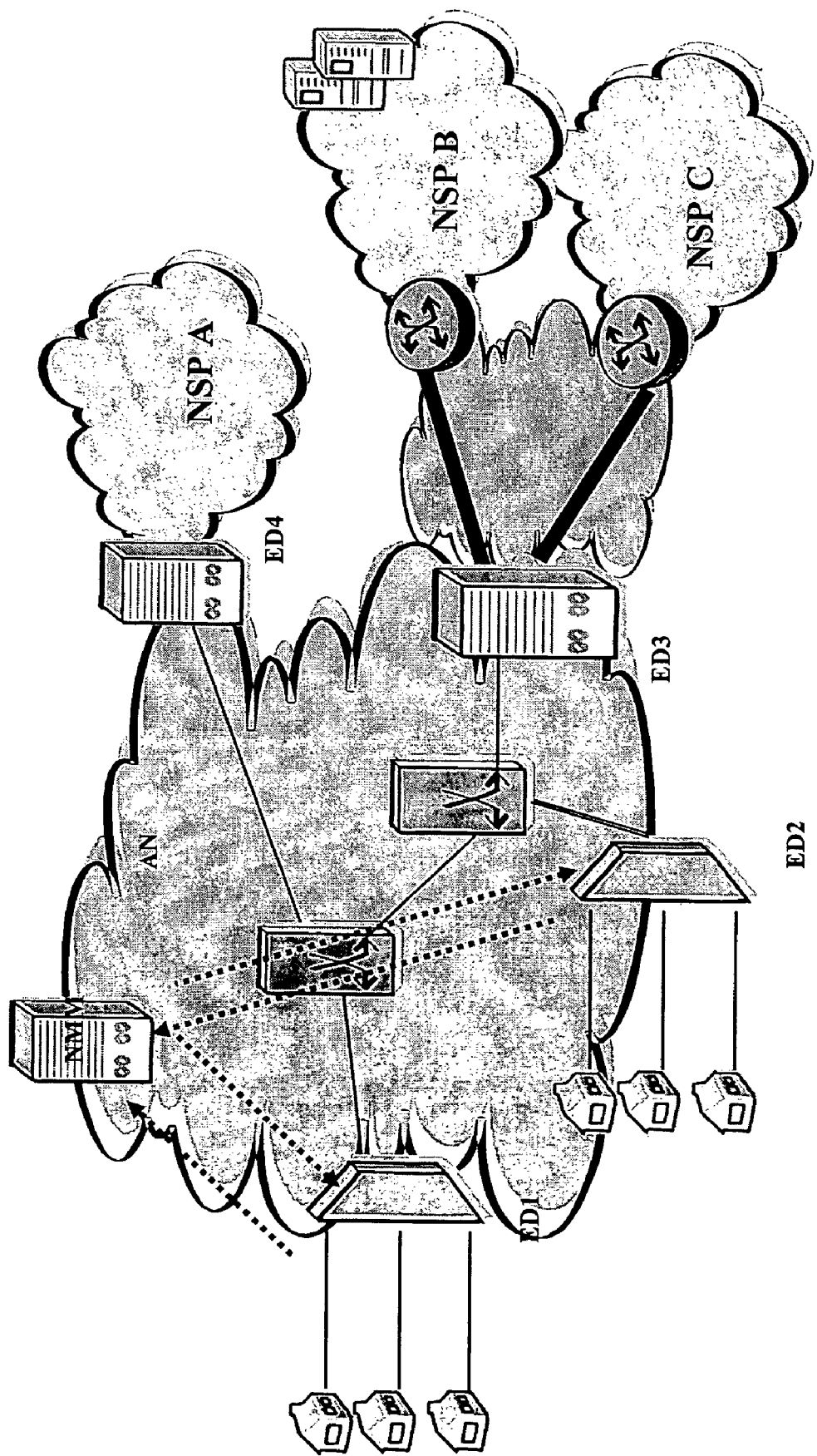

The present invention relates to a method for controlling and restricting communications to allowed edge devices in an access network. Such an access network, preferably a connectionless aggregation network such as an Ethernet access network, is depicted in FIG. 1. This figures shows 4 edge devices ED1 to ED4 of this network AN, of which ED1 and ED2 are access multiplexers for aggregation of traffic from several users which are depicted by the small houses coupled to these access multiplexers. Other edge devices such as ED3 and ED4 comprise interface devices with one or more service provider networks e.g. ED3 provides an interface to network service providers NSP B and NSP C, and ED4 provides an interface to network service provider NSP A.

Access networks are in general managed by a network management module which is depicted on FIG. 1 by block NMM. In general the task of such a network management module is to configure the access network by allocating bandwidths, charging, and user management possibilities. For the present invention one particular aspect of the network management is important, being its memory M1 for storing a list of allowed layer 2 addresses for corresponding allowed destination edge devices, for each edge device to which packets are entering the access network.

Figure 2:
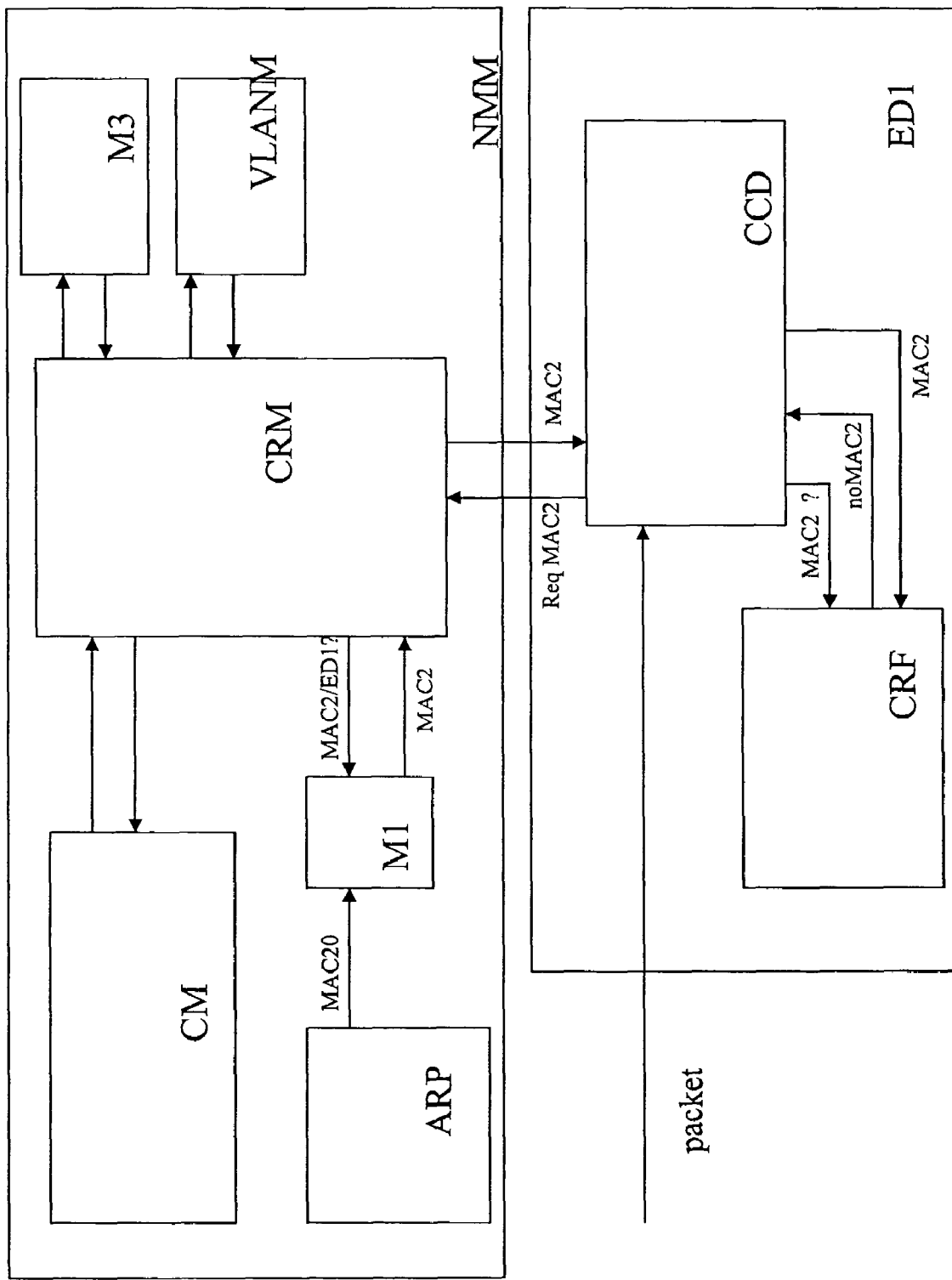
FIG. 2 shows details of edge device ED 1 and the network management module NMM for performing the method according to the invention.

Looking more into detail to this network management module on FIG. 2, one can observe that, apart from this memory M1 where these lists for all allowed edge destination nodes and their corresponding layer 2 destination addresses are stored, the network management module includes a communications restriction module (CRM) which is able to retrieve from the memory M1 these layer 2 destination addresses, and delivers them to an edge node, for instance ED1, but only after having received a request from ED1 with respect to this particular destination address. To this purpose edge device ED1 includes a communications control device CDD which generates these requests. In some embodiments these requests are always generated upon arrival of a packet. In a preferred embodiment of the invention these requests are only generated upon arrival of a packet including this layer 2 destination address, and only after checking within said edge device (ED1) that this layer 2 destination address is not stored yet within a communications restriction filter (CRF) therein. This check is indicated in FIG. 2 by a first communication arrow from the CCD to the CFR with the message "MAC2?", indicating that CCD informs whether MAC2 is present within CFR. The answer of CFR to CDD is indicated by the arrow from CRF to CCD with the message "noMAC2", indicating that this layer 2 destination address is not yet stored within the communications restriction filter. It may be remarked that, upon initialisation of the edge device, the filter may be preconfigured with some predetermined allowed addresses, or be empty.

If the communications control device CDD has thus not found this layer 2 destination address within this filter, it generates the request including this desired layer 2 destination address and forwards this to the communications restrictions module (CRM) in the network management module (NMM). This is schematically depicted by the arrow with the message "req MAC2". Upon receipt of this request, the CRM checks in the memory device M1 whether ED1 is allowed to forward packets to layer 2 destination address MAC2. This is represented by the arrow with the message schematically denoted "MAC2/ED1?" from CRM to M1 If this address is contained within the list of M1 for device ED1, this is retrieved from M1 to CRM, and represented by the arrow back from M1 to CRM denoted "MAC2". This information is subsequently passed to the communications control device CDD of the edge node ED1 which subsequently forwards this address MAC2 to the communications restriction filter CRF, as denoted by the arrow from CCD to CRF with the message "MAC2". It is stored there for a predetermined time, for instance 120 seconds. After this time has elapsed, this entry is again removed from the filter CRF. This allows to regularly request whether layer 2 destination addresses are still allowed such as to also become regularly updated of the changes. Other possibilities for having a very dynamic mechanism comprise requesting the communications restriction module each time a new packet arrives. Then each time such a packet arrives the filter is updated, independent on whether the layer 2 destination address is already present in the filter or not. For these implementations even a filter may be omitted from the edge devices. This type of solution however requires extra communication time between the edge node and the network management module.

In the case the requested address MAC 2 is not allowed for communications from ED1, the communications restriction module CRM will thus not find this address in M1, and accordingly cannot send this address back to ED1. This address can thus also not be stored within the communication restriction filter, such that the communications control device CCD, upon receiving an incoming packet with this layer 2 address as destination, will then block this packet from entry within the access network.

In case a failure has occurred in the destination edge node ED2 of which MAC2 was a layer 2 address of one port, a new port with a new MAC address will be used. The network management module, via an ARP module therein, transfers this up-to-date information to M1, either directly or via the CRM. ARP is the abbreviation of Address Resolution Protocol, which is an existing mechanism that takes care of the distribution of the updated addresses. This is however beyond the scope of this patent, and more information about this mechanism can be found in specialised literature.

FIG. 2 shows this mechanism via an arrow denoted MAC20 between ARP and M1. The sender of the packet is also informed, using the ARP mechanism that another port having for instance layer 2 address MAC20, has to be used. M1 now contains for ED1 an updated list wherein MAC2 is omitted and instead MAC20 is added. The sender of the packet, now informed to use MAC20, inserts this new layer 2 address in the header of its packet. If CRM subsequently asks M1 whether MAC20 is allowed for ED1, M1 will provide the info that indeed this MAC20 is allowed.

Address MAC 20 is subsequently provided by CRM to CCD, which subsequently stores this information within CRF. Accordingly, if new packets will then arrive in CCD having MAC20 in their header, CCD will then get from CRF the information that MAC20 is allowed.

In addition to the retrieval of allowed layer 2 destination addresses such as MAC addresses in Ethernet networks, the CRM can further get from another memory denoted VLANM in NMM additional layer 2 forwarding information such as a VLAN tag. VLAN is the abbreviation of virtual local area network and has the advantage to provide increased performance and manageability, physical topology independence and increased security. The above mentioned advantages can be used in the above described scenario for service segregation in the access network.

It is also possible that CRM gets from another memory, for instance M3 in FIG. 2, layer 3 or higher layer associated with the allowed layer 2 MAC addresses. The higher layer information is useful when certain protocols or applications have to be restricted.

CRM may be implemented as a communications restriction software agent in the network management module or as a hardware module.

In some embodiments of the method and of the edge device, the communications control device CDD of the edge node may also be able to insert, within the generated requests, user information with respect to the user which has sent the packet. This user information may comprise physical layer information such as for instance the line of the access multiplexer to which the user is connected. This user information is thus further passed through in the request to the CRM of the network management module. The latter extracts this user information from the request, and may provide this to a charging module CM. CM may accordingly respond by providing some charging information to CRM. This information is useful in case the desired layer 2 address is not stored within M1. This happens for instance for user-to-user communications within the access network itself, which are normally not allowed by the network management, since these cannot normally be charged. Using the present mechanism however, where the CRM consults the charging module CM upon receipt of such a request, the charging module becomes aware of this kind of communications, such that it can charge for it. CM can then further provide this information to CRM which can use this information to decide to allow the requested layer 2 address, thus by providing this address in response to a request including this layer 2 address from the ED1. While the principles of the invention have been described above in connection with specific apparatus, it is to be clearly understood that this description is made only by way of example and not as a limitation on the scope of the invention.

The invention claimed is:

1. A method for control of communications from a first edge device of an access network to at least one other edge device,
   comprising of provisioning or non-provisioning of at least one layer 2 destination address of the at least one other edge device of said access network to said first edge device by a network management module (NMM) of said access network,
   wherein, when provisioned, said at least one layer 2 destination address is delivered to said first edge device on request of said first edge device,
   wherein, when non-provisioned, said at least one layer 2 destination address is filtered from said first edge device.

2. The method according to claim 1, wherein, upon arrival of a packet including at least one layer 2 destination address, said first edge device checks whether said at least one layer 2 destination address is stored within a communications restriction filter of said first edge device and generates said request including said at least one layer 2 destination address when said at least one layer 2 destination address is not stored within said communication restriction filter.

3. The method according to claim 1, wherein additional information is delivered and stored together with said at least one layer 2 destination address in said first edge device.

4. The method according to claim 3 wherein said additional information comprises layer 2 forwarding information.

5. The method according to claim 3 wherein said additional information comprises higher OSI layer information.

6. The method according to claim 2 wherein said at least one layer 2 destination address of said at least one other edge device is removed from said communication restriction filter after a predetermined period of time.

7. The method according to claim 2, wherein said request further comprises user information with respect to sender of said packet.

8. The method according to claim 7 wherein said network management module provides said user information to a charging module.

9. The method according to claim 8 wherein said charging module provides further charging information with respect to the sender of said packet to said network management module, which thereupon may proceed with delivering said at least one layer 2 destination address to said first edge node.

10. The method according to claim 1 wherein, if said at least one layer 2 destination address is not stored within said first edge device or is not received by said first edge device from said network management module, said first edge device blocks said incoming packet from further passing through said access network.

11. A first edge device of an access network, said first edge device including a communication restriction filter, which stores at least one layer 2 destination address of at least one other edge device of said access network,
   wherein said first edge device further comprises a communications control device which requests and receives said at least one layer 2 destination address from a network management module outside said access network, and which further provisions said at least one layer 2 destination address to said communication restriction filter; and
   wherein said communications restriction filter stores additional information associated with said at least one layer 2 destination address.

12. The first edge device according to claim 11, wherein said communications control device further generates said request upon the arrival of a packet including said at least one layer 2 destination address, and upon checking that said at least one layer 2 destination address is not stored within said communication restriction filter, and wherein said at least one layer 2 destination address is inserted in said request.

13. The first edge device according to claim 11 wherein said additional information comprises at least one of layer 2 destination information, routing information, and further physical layer information.

14. The first edge device according to claim 11, wherein said communication restriction filter removes said at least one layer 2 destination address after a predetermined period of time.

15. The first edge device according to claim 12, wherein said communication control device inserts user information with respect to the sender of said packet, in said request.

16. The first edge device according to claim 12, wherein said communication control device blocks incoming packet from further passing within said access network, if said at least one layer 2 destination address is not stored in said communications restriction filter or not received from said network management module.

17. A communications restriction module of a network management module for an access network which obtains from a memory device of said network management module at least one layer 2 destination address and delivers to an edge device of said access network, wherein said communications restriction module only delivers said at least one layer 2 destination address to said edge device upon receipt of a request from said edge device;

wherein the communications restriction module retrieves and provides additional information associated with said at least one layer 2 destination address in addition to said at least one layer 2 destination address to said edge device.

18. The communications restriction module according to claim 17, wherein said communications restriction module only delivers said at least one layer 2 destination address to said edge device upon retrieving said at least one layer 2 destination address within said request from said edge device.

19. The communications restriction module according to claim 17, wherein the communications restriction module obtains additional layer 2 destination information from another memory means of said network management module and provides said additional layer 2 destination information to said edge device.

20. The communications restriction module according to claim 17, wherein the communications restriction module obtains higher OSI layer information pertaining to said at least one layer 2 destination address from an address resolution protocol module and provides said higher OSI layer information to said edge device.

21. The communications restriction module according to claim 17, wherein the communications restriction module extracts from said request from said edge device additional user information, and provisions said additional information to a charging module.

22. The communications module according to claim 21, wherein the communications restriction module receives from said charging module user billing information, and based on the billing information said communications restriction module provides said at least one layer 2 destination address even when said at least one layer 2 destination address could not be retrieved from said memory device.

\* \* \* \* \*